Figure 1:
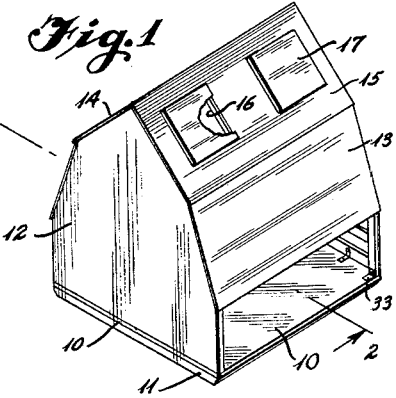

Dec. 4, 1962 P. J. GEERLINGS 3,066,649
BULK GRAVITY FLOW LIVESTOCK FEEDER
Filed March 18, 1960 2 Sheets-Sheet 1

INVENTOR
P.J. Geerlings
BY
ATTORNEY

Dec. 4, 1962  P. J. GEERLINGS  3,066,649
BULK GRAVITY FLOW LIVESTOCK FEEDER
Filed March 18, 1960  2 Sheets-Sheet 2
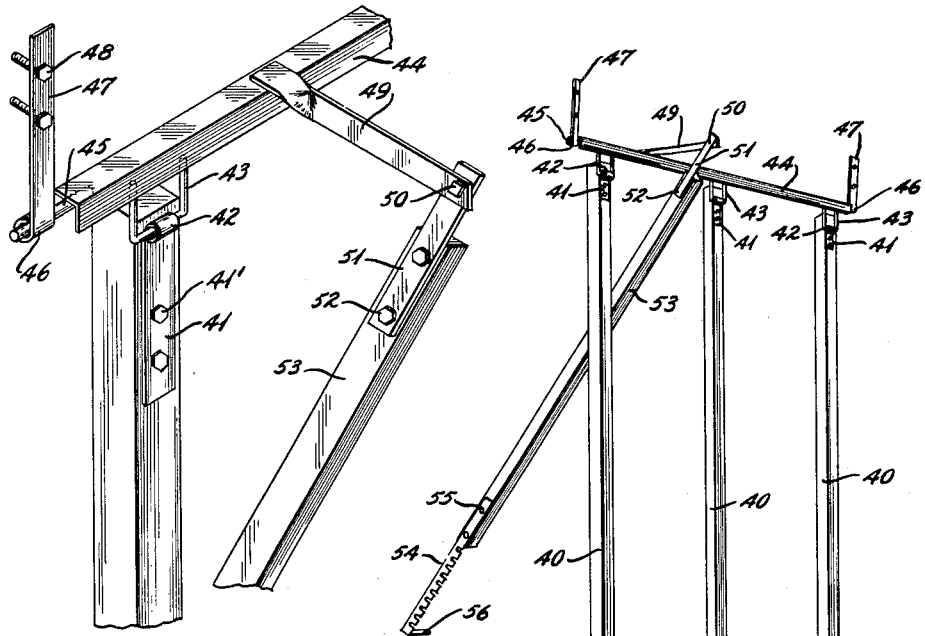
Fig. 5
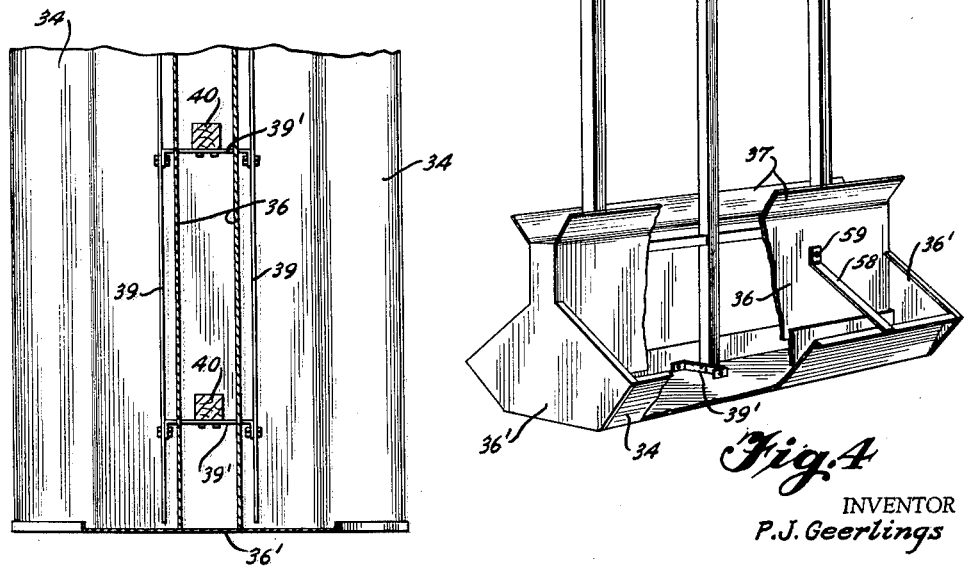
Fig. 6
Fig. 4
INVENTOR
P. J. Geerlings
BY
ATTORNEY

United States Patent Office 3,066,649
Patented Dec. 4, 1962

3,066,649
BULK GRAVITY FLOW LIVESTOCK FEEDER
Petrus J. Geerlings, 2001 Westfield, Waterloo, Iowa
Filed Mar. 18, 1960, Ser. No. 16,050
5 Claims. (Cl. 119—53.5)

This invention relates to the feeding and raising of livestock including hogs and other animals and to equipment employed for the presentation and dispensing of feed to the livestock at all times in the amount required for consumption by the animals and to equipment which will not require the constant attention of an attendant.

The invention relates particularly to a livestock feeder for holding a relatively large quantity of bulk feed in a manner to provide a constant supply and with variable means for dispensing the feed and for replenishing the feed at the place of consumption as it is consumed.

Various types of feeders have been produced but these have been clumsy, expensive to change or move from place to place and lacked satisfactory means for controlling the dispensing of the feed, have been subject to clogging, could be used only with certain kinds of feed, required special tools and substantial delay when it was desired to change the amount of the flow and also prior devices have been limited in size, lacked stability, promoted dampness and otherwise were unsatisfactory.

It is an object of the invention to provide a simple, inexpensive, variable discharge type of knock-down feeder, the principal components of which can be sold to and utilized by the purchaser to construct a feeder on location, one of the principal components being the dispensing and control means and adjustable means by which the amount of feed discharged can be varied.

Another object of the invention is to provide feeder components which can be prefabricated and used in the production of a feeder and of materials affording long life without leaks and dampness, which will not clog, which can be used to feed animals of various sizes individually or in groups, which has finger tip control by which the supply of feed can be readily controlled or interrupted without the use of tools, and which feeder is capable of being moved in sections or as a unit.

A further object of the invention is to provide a bulk feeder which will operate more satisfactorily as a gravity feeder from a large mass or body of feed and including a bulk storage space and which feed can be dispensed by the action of the animals and the dispensing of the feed facilitated by an agitator extending from the top of the feeder so that the animals may obtain the feed required, the agitator including means for varying or interrupting the flow which automatically stops functioning when enough feed is available as well as a structure which will prevent waste, save time and money and contribute to the economy and efficiency of the raising of animals in a manner to allow profit to be realized therefrom.

Figure 3:
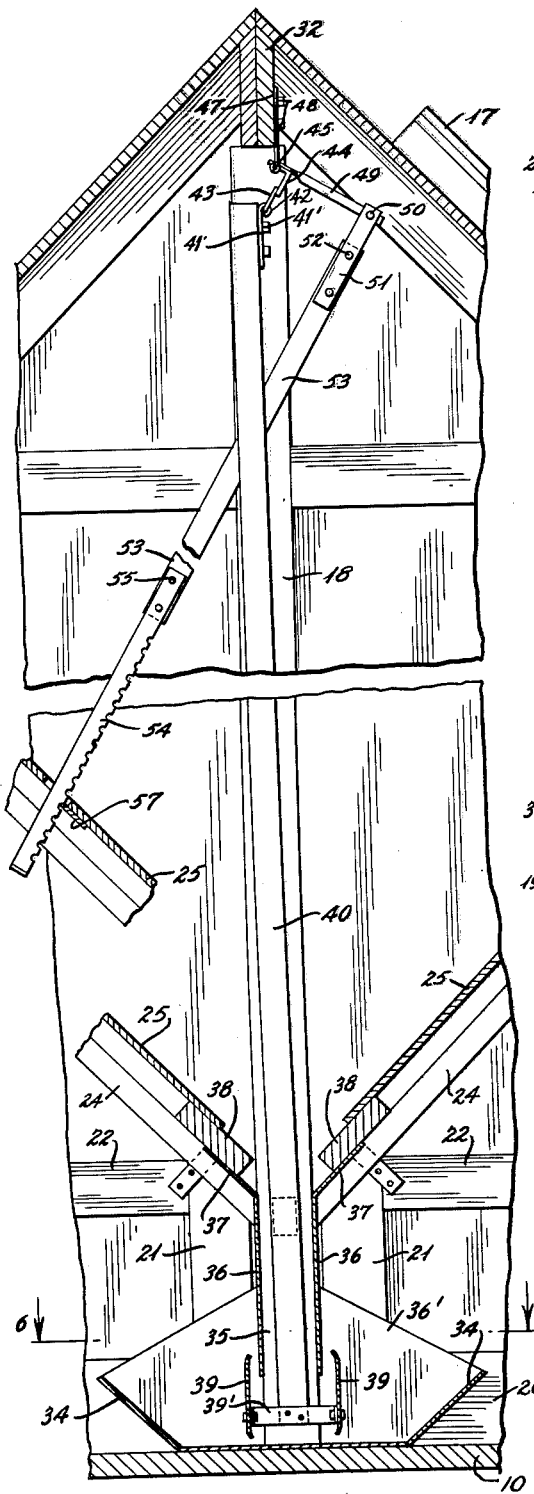
Figure 2:
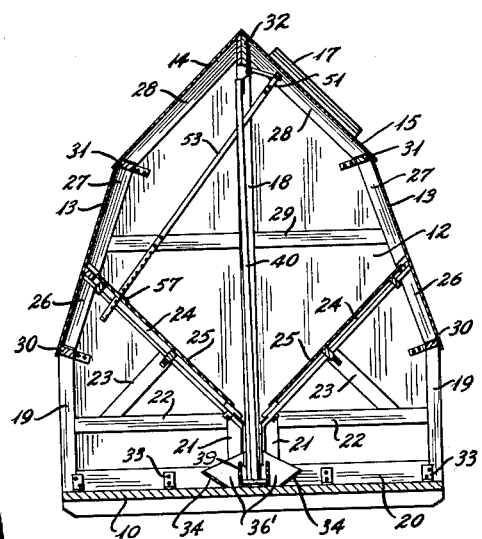

Other objects and advantages of the invention will be apparent from the following description taken in conjunction with the accompanying drawings wherein:

FIG. 1 is a perspective of a bulk gravity flow feeder illustrating one application of the invention;

FIG. 2, a slightly enlarged vertical section on the line 2—2 of FIG. 1;

FIG. 3, a greatly enlarged fragmentary detail vertical section;

FIG. 4, a perspective of the agitator control and dispensing mechanism as well as the manipulating apparatus by which the control is produced;

FIG. 5, an enlarged fragmentary detail perspective of the upper end of the structure of FIG. 4; and FIG. 6, a fragmentary section on the line 6—6 of FIG. 3.

Briefly stated the invention comprises a dispensing unit having oppositely disposed open troughs supplied from a central lengthwise chamber containing a discharge control and agitator, the raising and lowering of which determines the size of the passage between the central chamber and the feed troughs. Uprights support the discharge control and function as agitators and each of these is connected by a fixed link to a top mounting bar, the ends of which are pivoted in supporting brackets attached to a ridge pole of a house so that when the pivoted top mounting bar is rotated the links will be swung in an arc to raise and lower the uprights and the discharge control and agitator mechanism at the lower end thereof. In order to accomplish this raising and lowering, an arm is fixed to the pivoted top mounting bar and an operating bar is pivoted to the end of such arm, the free end of such operating bar being provided with an extension having a series of notches adapted to engage a plate in the floor through which the operating bar extends. The trough with which the dispensing unit is associated is adapted to be supported on the floor of a bin or house composed of end and side members and trough-forming members which are inclined downwardly into slightly spaced relation to cause feed to flow into the central chamber of the feeding unit.

With continued reference to the drawings, the gravity flow livestock feeder of the present invention comprises a bin having a floor 10, mounted on skids 11, ends 12, wall plates 13, 14 and 15 the latter having feed inlets 16 with sliding or other type covers 17. The end members 12 are provided wtih central reinforcing strips 18 and lower side strips 19 one at each side, a transverse bottom strip 20, oppositely disposed spaced central uprights 21 between which and the side members 19 are disposed braces 22 on which are mounted angular braces 23 which reinforce a pair of converging bars 24 on which a pair of bin bottom forming plates 25 are allowed to rest, such plates forming in effect a trough for the gravity flow of grain downwardly to the bottom thereof. The edges of the end members are marginally reinforced by strips 26 at each side in alignment with a second slightly longer strip 27, the strips 26 and 27 serving to support the wall plates 13. In like manner the plates 14 and 15 receive support from marginal strips 28. If desired the end members 12 may have horizontal cross braces 29 which connect the marginal reinforcing strips 27 with the central reinforcing strip 18. Also if desired horizontally disposed longitudinal braces 30 and 31 may connect the end members 12. The ends 12 likewise may be connected at their apex by a pair of parallel members providing a ridge pole 32.

The end members may be anchored to the floor in any desired manner as, for example, by brackets 33 and the braces 24, 30, 31 may be fastened to the end members in like manner by similar brackets.

The house or structure described may be obtained from any desired source or produced by the livestock grower and within such housing is placed a dispensing unit of oppositely disposed open troughs 34 supplied from a central lengthwise feed reserve chamber 35 defined by side plates 36 and end plates 36' having angular outwardly disposed mouth forming flanges 37 at their upper ends and on which the lower marginal strips 38 of the plates 25 rest so that feed moving by gravity down the plates will flow into the chamber 35.

A dispensing unit is provided having a gate valve or discharge control comprising a pair of elongated strips or plates 39 mounted by brackets 39' to the lower ends of multiple agitator forming uprights 40. The upper ends of the uprights 40 are provided with hinge members 41 secured by fasteners 41' or the like to the uprights and having a cylindrical end 42 in which is received a link 43 fixed to a mounting bar 44. Such mounting bar has end pivots 45 which are rotatably received in the hinge forming end 46 of supported brackets 47 attached to the ridge pole 32 by means of fasteners 48. When the mounting bar 44 is rotated the links 43 fixed thereto likewise will be rotated to raise and lower the uprights 40 and the strips 39.

In order to raise the uprights the top mounting bar 44 has an arm 49 fixed thereto, the outer end of which is connected by a pivot 50 with a control strip 51 connected by fasteners 52 with an operating extension 53 having a notched bar 54 attached to its lower end by means of fasteners 55. The lower end of the notched bar 54 is bent at right angles to form a handle 56 and the notched portion of the bar is adapted to extend through one of the plates 25 and engage a plate 57 for securing the parts in fixed relation. When it is desired to change the adjustment of the dispensing unit all that is necessary is that the bar 55 be disengaged from the plate 57 and the operating extension 53 be raised or lowered to the position desired and the bar 55 placed in engagement with the plate 57.

If desired the sides of the trough may be provided with stall forming reinforcing bars 58 secured in place by fasteners 59 attached to the outer edge of the trough 34 and to the upright walls 36.

In the operation of the feeder, feed in the bin is fed by gravity downwardly through the relatively narrow chamber 35. The weight of the feed tends to pack the feed at the bottom of the bin and to bridge the chamber 35. However, when livestock is feeding, contact with the elongated strips 39 will produce movement of the uprights 40 and release the bridge to allow the feed to gravitate into the chamber. The feed within the chamber does not have sufficient weight to pack or bridge and is therefore loose at all times and is instantly available to the livestock.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A bulk feed animal feeder comprising spaced ends and downwardly inclined bin bottom forming members terminating in closely spaced relation at their lower edges, a pair of side plates and a pair of end plates defining a central chamber into which feed can gravitate from said bin bottom forming members, oppositely disposed feed troughs located below said central chamber and adapted to receive feed therefrom, a ridge pole connecting said spaced ends above said central chamber, feed retaining walls on opposite sides of said ridge pole, a feed controlling and agitating unit including uprights extending upwardly through said central chamber to a position adjacent said ridge pole and control means disposed longitudinally beanth said central chamber and capable of being raised and lowered to agitate and control the amount of feed discharged from said central chamber into said feed troughs, a bar pivotally suspended beneath said ridge pole, links fixed to said bar and connected to said uprights, an operating arm attached to said pivoted bar, an operating extension pivotally connected to said arm, the lower end of said operating extension extending through one of said inclined bin-bottom forming members and having notches for interlocking with the latter whereby the adjustment of said feed control can be secured in fixed position.

2. A dispensing unit for use in the manufacture of a bulk animal feeder comprising a horizontally elongated feed chamber having an outlet along its bottom, discharge control means, support means for said discharge control means located in said outlet and forming a single combination control and agitator unit for said dispensing unit, an upright extending upwardly from said control unit, a mounting bar, linkage connecting said mounting bar with said one or more uprights, a pair of end members, a ridge pole connecting said end members, said mounting bar being pivotally supported by said ridge pole, and means for rotating said support to move said links and uprights to operate said control unit.

3. A gravity flow bulk feeder comprising a housing, structure defining a feed chamber with a bottom discharge opening, control means for said opening, adjustable support means for said control means including an upright extending through said discharge opening, a mounting member pivotally supported by said housing, linkage pivotally connecting said mounting member and said upright, and means whereby said mounting member may be actuated to operate said discharge control means.

4. The structure of claim 3 and a trough for receiving feed from said control means.

5. A dispensing unit for structure defining a feed chamber having an outlet along its bottom comprising adjustable discharge control means, agitator means connected to said discharge control means and extending upwardly through said feed chamber, a support, a mounting bar pivotally carried by said support, hinge means pivotally connecting said agitator means to said mounting bar to permit horizontal movement of said discharge control means, and means for operating said mounting bar to raise and lower said discharge control means to regulate the amount of feed dispensed.

References Cited in the file of this patent

UNITED STATES PATENTS

| | | |
|---|---|---|
| 1,269,108 | Nichols | June 11, 1918 |
| 1,357,755 | Wilch | Nov. 2, 1920 |
| 2,525,385 | Uhrenholdt | Oct. 10, 1950 |
| 2,808,029 | Geerlings | Oct. 1, 1957 |

FOREIGN PATENTS

| | | |
|---|---|---|
| 104,514 | Australia | July 8, 1938 |